(12) United States Patent
Robertson, Jr. et al.

(10) Patent No.: US 12,546,865 B2
(45) Date of Patent: Feb. 10, 2026

(54) SENSOR ASSEMBLY WITH CLEANING

(71) Applicant: Ford Global Technologies, LLC, Dearborn, MI (US)

(72) Inventors: Michael Robertson, Jr., Garden City, MI (US); Tyler D. Hamilton, Farmington, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 18/178,656

(22) Filed: Mar. 6, 2023

(65) Prior Publication Data

US 2024/0302499 A1 Sep. 12, 2024

(51) Int. Cl.
*G01S 7/481* (2006.01)
*G01S 17/931* (2020.01)
*G01S 7/497* (2006.01)

(52) U.S. Cl.
CPC .......... *G01S 7/4813* (2013.01); *G01S 17/931* (2020.01); *G01S 2007/4977* (2013.01)

(58) Field of Classification Search
USPC .......................................................... 73/431
See application file for complete search history.

(56) References Cited

U.S. PATENT DOCUMENTS

| | | | |
|---|---|---|---|
| 6,793,416 B2 | 9/2004 | Peterson et al. | |
| 9,278,670 B2 | 3/2016 | Hattori et al. | |
| 9,505,382 B2 | 11/2016 | Gokan | |
| 10,293,794 B2 | 5/2019 | McAndrew | |
| 10,328,906 B2 | 6/2019 | Hester et al. | |
| 10,610,074 B2 * | 4/2020 | Schmidt | A47L 9/08 |
| 10,761,190 B1 * | 9/2020 | Sykula | G01S 17/931 |
| 11,680,830 B2 * | 6/2023 | Krishnan | G01S 7/4813 73/431 |
| 12,115,948 B2 * | 10/2024 | Hamilton | G01S 7/4813 |
| 2018/0015907 A1 | 1/2018 | Rice | |
| 2018/0149742 A1 * | 5/2018 | Izadian | H01Q 1/428 |
| 2019/0008345 A1 * | 1/2019 | Schmidt | B60S 1/54 |
| 2020/0393550 A1 * | 12/2020 | Hamilton | G01S 17/931 |
| 2023/0124645 A1 * | 4/2023 | Robertson, Jr. | G01S 7/497 356/5.01 |
| 2023/0160727 A1 * | 5/2023 | Thomsson | E02F 9/264 73/431 |
| 2023/0184895 A1 * | 6/2023 | Kazandjian | G01S 7/4813 73/431 |
| 2024/0198975 A1 * | 6/2024 | Chaudhari | B60R 11/00 |

* cited by examiner

*Primary Examiner* — Walter L Lindsay, Jr.
*Assistant Examiner* — Warren K Fenwick
(74) *Attorney, Agent, or Firm* — Frank A. MacKenzie; Brooks Kushman P.C.

(57) ABSTRACT

A sensor assembly includes a bracket, a blower mounted to the bracket and supported by the bracket, and a sensor mounted to the bracket and supported by the bracket. The sensor includes a sensor window. The bracket is a single piece. The bracket includes a duct positioned to receive airflow directly from the blower. The duct includes a duct outlet positioned to direct the airflow traveling through the duct onto the sensor window.

20 Claims, 8 Drawing Sheets

SENSOR ASSEMBLY WITH CLEANING

BACKGROUND

Vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. A lidar device detects distances to objects by emitting laser pulses and measuring the time of flight for the pulse to travel to the object and back.

DETAILED DESCRIPTION

Figure 1:
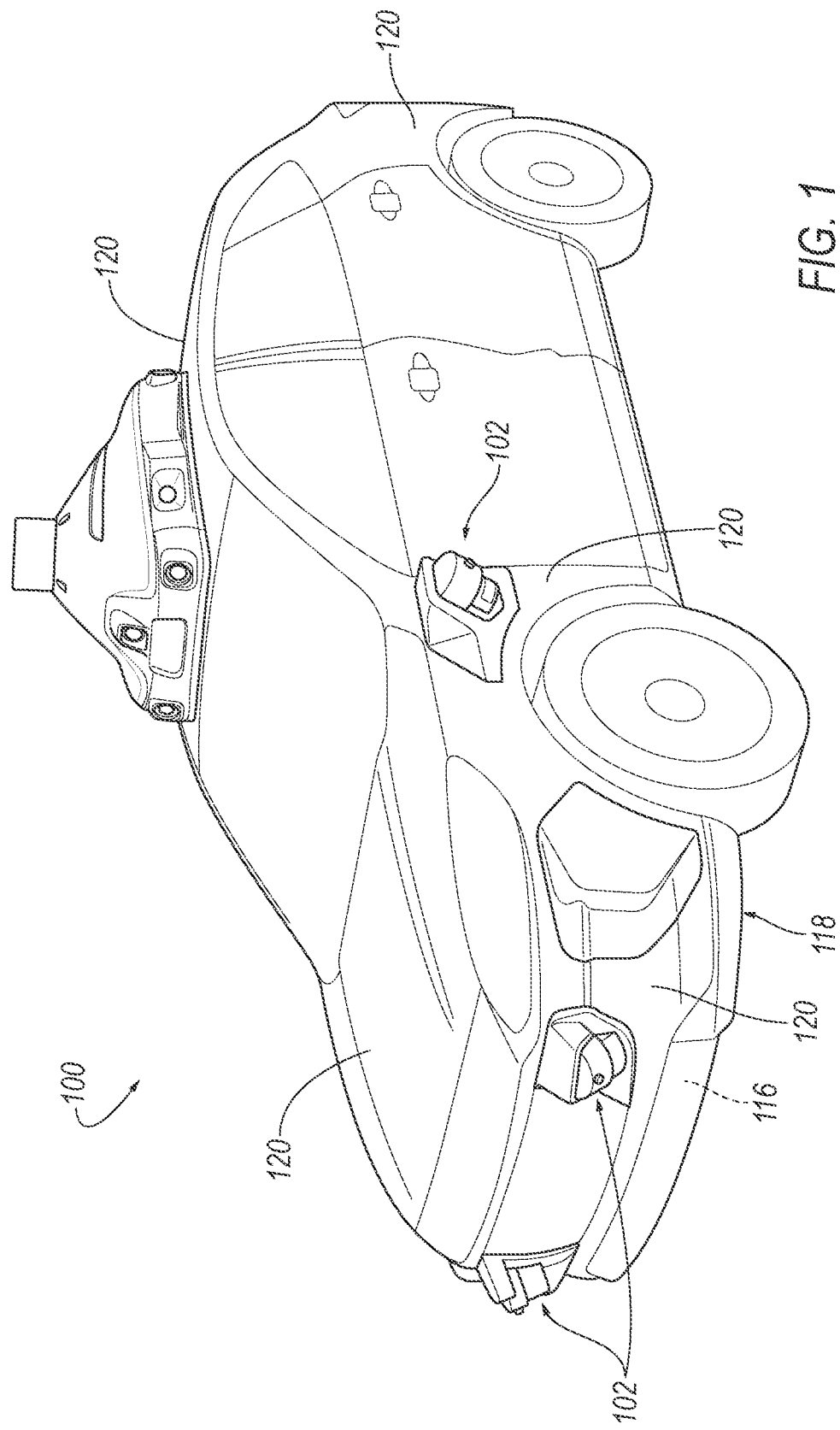
FIG. 1 is a perspective view of an example vehicle with an example sensor assembly.

A sensor assembly includes a bracket, a blower mounted to the bracket and supported by the bracket, a sensor mounted to the bracket and supported by the bracket, and the sensor including a sensor window. The bracket is a single piece. The bracket includes a duct positioned to receive airflow directly from the blower. The duct includes a duct outlet positioned to direct the airflow traveling through the duct onto the sensor window.

In an example, the blower may include a blower outlet, the duct may include a duct inlet, and the blower outlet may be positioned inside the duct inlet. In a further example, a cross-sectional area of the duct outlet may be smaller than a cross-sectional area of the duct inlet.

In an example, the bracket may include a blower panel to which the blower is mounted. In a further example, the blower may include a blower inlet, and the blower panel may include a port aligned with the blower inlet and abutting the blower inlet. In a yet further example, the duct may be a first duct, the bracket may include a second duct elongated from the port. In a still yet further example, the second duct may be elongated from the port to a free end, and the free end may be spaced from the first duct. In a further still yet further example, the second duct may extend directly below the first duct. In a yet further still yet further example, the sensor may be positioned directly between the first duct and the second duct.

In an example, the sensor may be suspended from the bracket. In a further example, the sensor may be suspended from the duct. In a yet further example, the sensor may abut the duct.

In another yet further example, the sensor may be fastened to the duct. In a still yet further example, the sensor assembly may further include a fastener fastening the sensor to the duct, the bracket may include a fastener receptacle extending through the duct, and the fastener may extend through the fastener receptacle.

In an example, the bracket may include a fluid nozzle shaped to dispense fluid onto the sensor window. In a yet further example, the bracket may include a fluid line elongated from the fluid nozzle. In a still yet further example, the fluid line may extend through an interior of the duct.

In another still yet further example, the fluid line may be partially formed of a panel of the duct.

In another yet further example, the bracket may include a fluid inlet fluidly connected to the fluid nozzle, and the fluid inlet may be shaped to connect to a hose.

In another yet further example, the fluid nozzle may be positioned in the duct outlet.

With reference to the Figures, wherein like numerals indicate like parts throughout the several views, a sensor assembly 102 of a vehicle 100 includes a bracket 104, a blower 106 mounted to the bracket 104 and supported by the bracket 104, and a sensor 108 mounted to the bracket 104 and supported by the bracket 104. The sensor 108 includes a sensor window 110. The bracket 104 is a single piece. The bracket 104 includes a first duct 112 positioned to receive airflow directly from the blower 106. The first duct 112 includes a first duct outlet 114 positioned to direct the airflow traveling through the first duct 112 onto the sensor window 110.

The sensor assembly 102 provides the airflow to the sensor window 110. The airflow may clean the sensor window 110 by blowing debris off of the sensor window 110. The airflow may also provide an air curtain to deflect debris traveling toward the sensor window 110 away from the sensor window 110. Moreover, the sensor assembly 102 provides these cleaning benefits while also having a small package space and low dimensional stackup. The sensor assembly 102 achieves these additional benefits by using a bracket 104 that is a single piece as the duct, as a mounting point from which to support the blower 106, and as a mounting point from which to support the sensor 108.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a frame 116 and a body 118. The vehicle 100 may be of a unibody construction, in which the frame 116 and the body 118 of the vehicle 100 are a single component. The vehicle 100 may, alternatively, be of a body-on-frame construction, in which the frame 116 supports the body 118 that is a separate component from the frame 116. The frame 116 and body 118 may be formed of any suitable material, for example, steel, aluminum, etc.

The body 118 includes body panels 120 partially defining an exterior of the vehicle 100. The body panels 120 may present a class-A surface, e.g., a finished surface exposed to view by a customer and free of unaesthetic blemishes and defects.

While the discussion below is with respect to a single sensor assembly 102 of the vehicle 100, the vehicle 100 may include multiple sensor assemblies 102. The sensor assemblies 102 are mounted to the frame 116. The sensor assemblies 102 are disposed on the body panels 120. For example, one of the sensor assemblies 102 may be disposed on a front end of the vehicle 100 below windows of the vehicle 100, as shown in FIG. 1. The sensor assemblies 102 may be arranged to provide the sensors 108 therein with a collective field of view entirely around a front end of the vehicle 100 or around an entirety of the vehicle 100.

Figure 2:
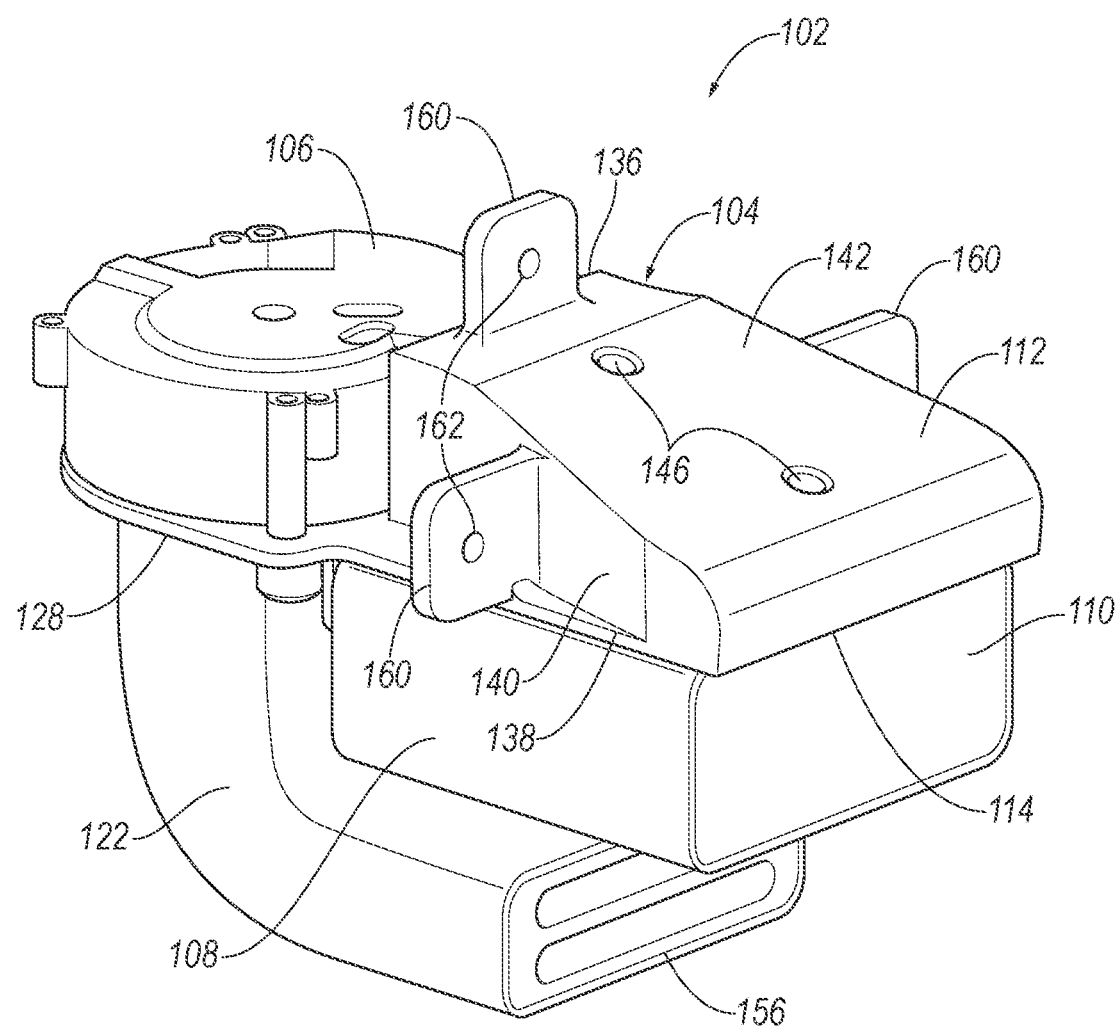
FIG. 2 is a perspective view of a first example of a portion of the sensor assembly.
Figure 3:
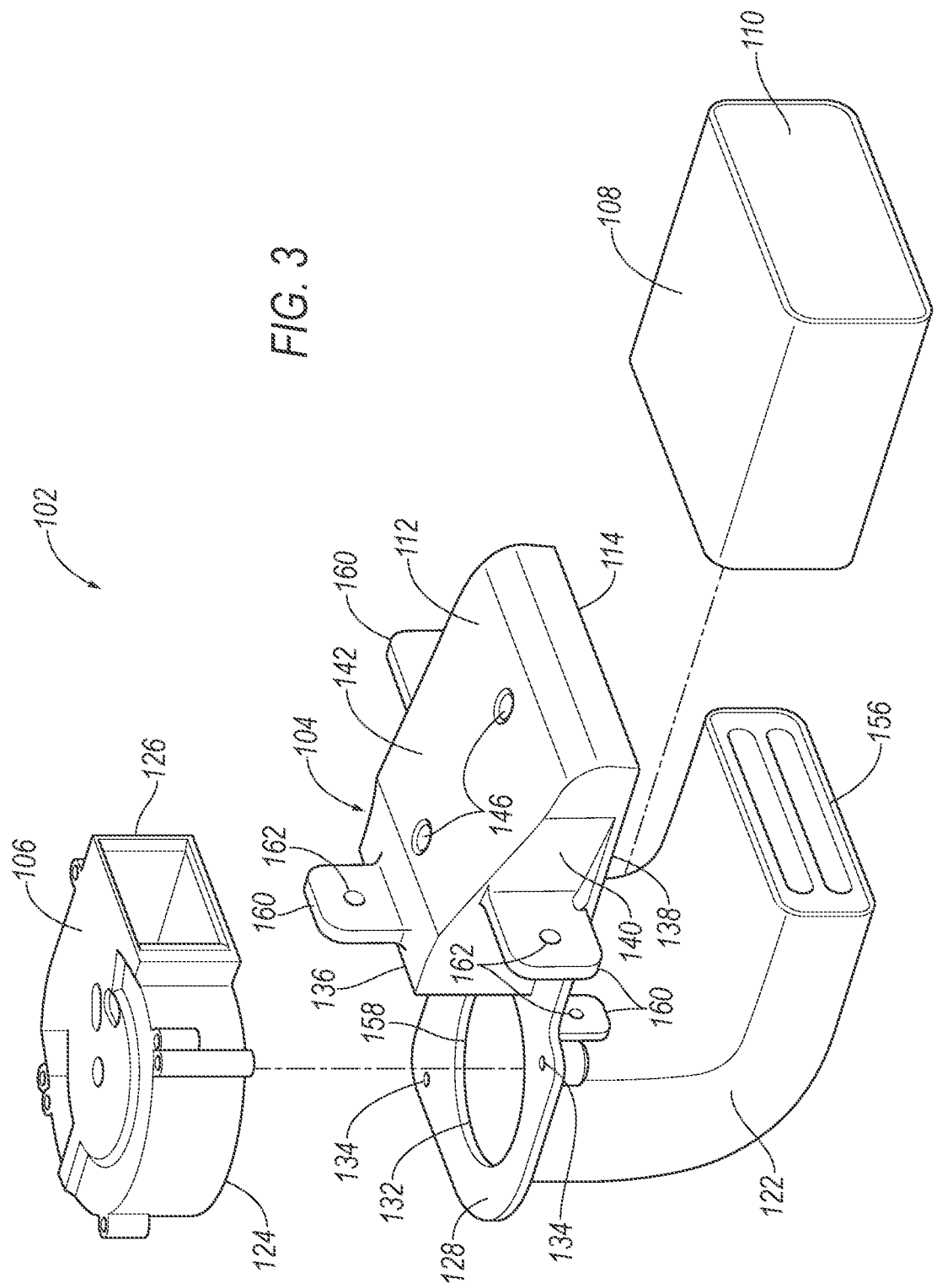
FIG. 3 is an exploded perspective view of the portion of the first example of the sensor assembly.
Figure 4:
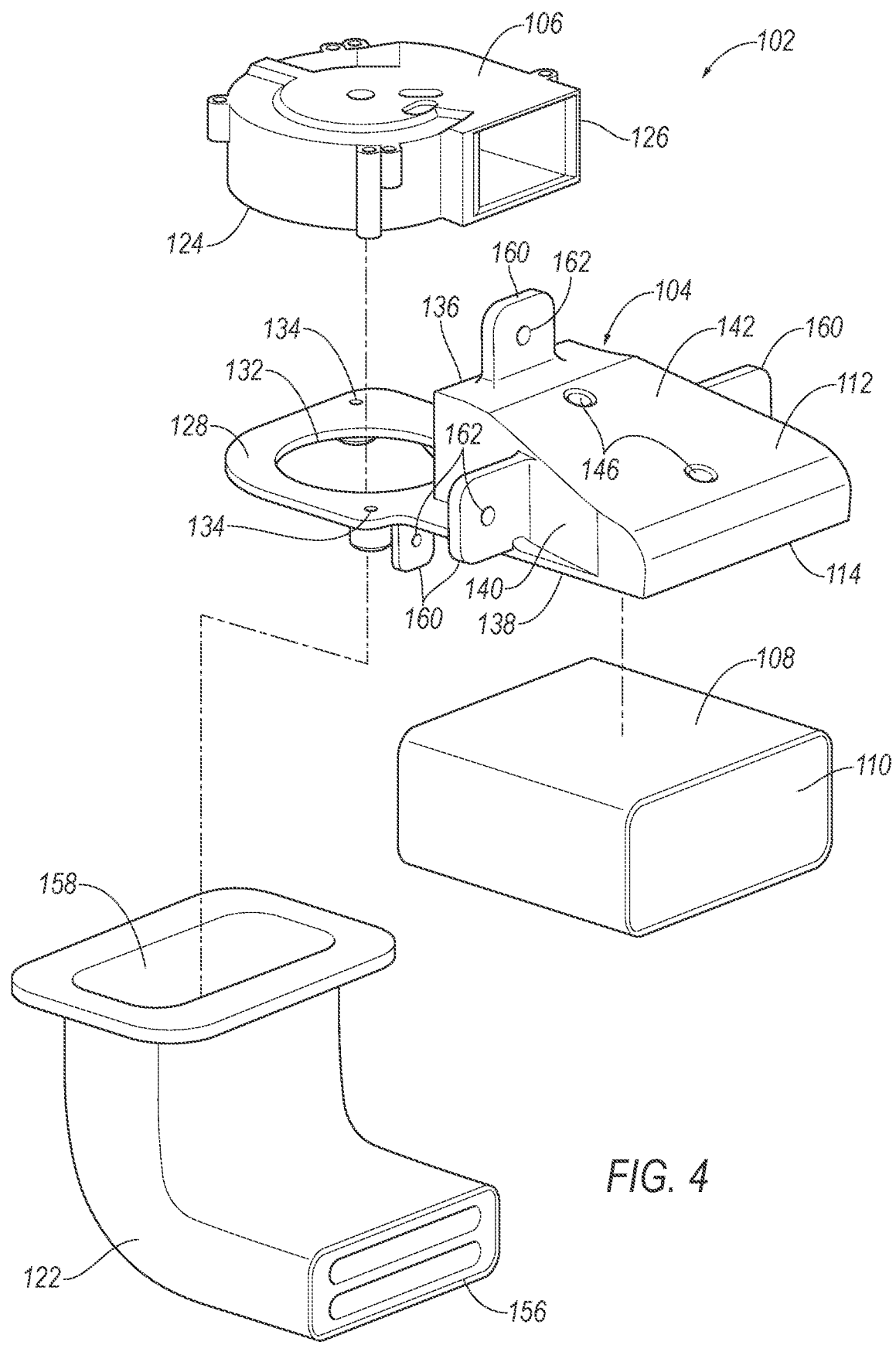
FIG. 4 is an exploded perspective view of the portion of a second example of the sensor assembly.

With reference to FIGS. 2-4, the sensor assembly 102 includes the sensor 108, the blower 106, and the bracket 104. The sensor assembly 102 may further include a second duct 122, as shown in FIG. 4. Alternatively, the bracket 104 may include the second duct 122, as shown in FIG. 3. (FIG. 2 is consistent with both FIG. 3 and FIG. 4.)

The sensor 108 may detect the external world, e.g., objects and/or characteristics of surroundings of the vehicle 100, such as other vehicles, road lane markings, traffic lights and/or signs, pedestrians, etc. For example, the sensor 108 may be a radar sensor, an ultrasonic sensor, a scanning laser range finder, a light detection and ranging (lidar) device, an image processing sensor such as a camera, etc. In particular, the sensor 108 may be a lidar device, e.g., a scanning lidar device. A lidar device detects distances to objects by emitting laser pulses at a particular wavelength and measuring the time of flight for the pulse to travel to the object and back.

The sensor 108 includes the sensor window 110. The sensor window 110 can be oriented generally vertically, i.e., extends up and down. For example, the sensor window 110 may be generally flat, as shown in the Figures. For another example, the sensor window 110 may be partially cylindrical or curved, defining an axis that extends generally vertically. The sensor window 110 is transparent with respect to whatever medium the sensor 108 is capable of detecting. For example, if the sensor 108 is a lidar device, then the sensor window 110 is transparent at least with respect to visible light at the wavelength generated and detectable by the sensor 108. The field of view of the sensor 108 extends through the sensor window 110.

The blower 106 increases the pressure of a gas by reducing a volume of the gas or by forcing additional gas into a constant volume. The blower 106 may be any suitable type, e.g., positive-displacement such as a reciprocating, ionic liquid piston, rotary screw, rotary vane, rolling piston, scroll, or diaphragm; dynamic such as an air bubble, centrifugal, diagonal, mixed-flow, or axial-flow; or any other suitable type. The blower 106 includes a blower inlet 124, into which air is drawn by operation of the blower 106, and a blower outlet 126, out of which air is expelled by operation of the blower 106, as shown in FIGS. 3 and 4.

With continued reference to FIGS. 2-4, the bracket 104 is integral, i.e., a single piece, i.e., made of a single, uniform piece of material with no seams, joints, fasteners, or adhesives holding it together. For example, if the bracket 104 has been formed by a 3D-printing process, then the final product is a single piece. The bracket 104 may include the first duct 112, a blower panel 128, a fluid network 130 (shown in FIGS. 5-7), the second duct 122 (shown in FIG. 3), and/or at least one mounting plate 160. By making the bracket 104 a single piece, the sensor assembly 102 may have a minimal dimensional stackup, e.g., between the second duct 122 and the blower 106, between the sensor 108 and the first duct 112, and/or between the mounting plates 160 and the frame 116.

The bracket 104 includes the blower panel 128. The blower 106 is mounted to the bracket 104, specifically to the blower panel 128. The blower 106 is supported by the bracket 104, specifically by the blower panel 128. For the purposes of this disclosure, "A is supported by B" is defined as B holding up at least a portion of the weight of A. The bracket 104, specifically the blower panel 128, may support an entire weight of the blower 106. The blower 106 may abut the blower panel 128, e.g., a top side of the blower panel 128. The blower panel 128 may be a flat panel having a constant thickness. The blower panel 128 includes a port 132 aligned with the blower inlet 124. The port 132 may abut the blower inlet 124. The port 132 permits airflow from the second duct 122 to the blower inlet 124. The blower panel 128 may include at least one fastener hole 134 positioned to receive fasteners coupling the blower 106 to the blower panel 128.

The bracket 104 may include one or more mounting plates 160. The mounting plates 160 may extend away from other portions of the bracket 104, e.g., the first duct 112 and/or the blower panel 128. The mounting plates 160 may include fastener holes 162 for receiving fasteners, thereby permitting attachment of the bracket 104 to the frame 116.

Figure 5:
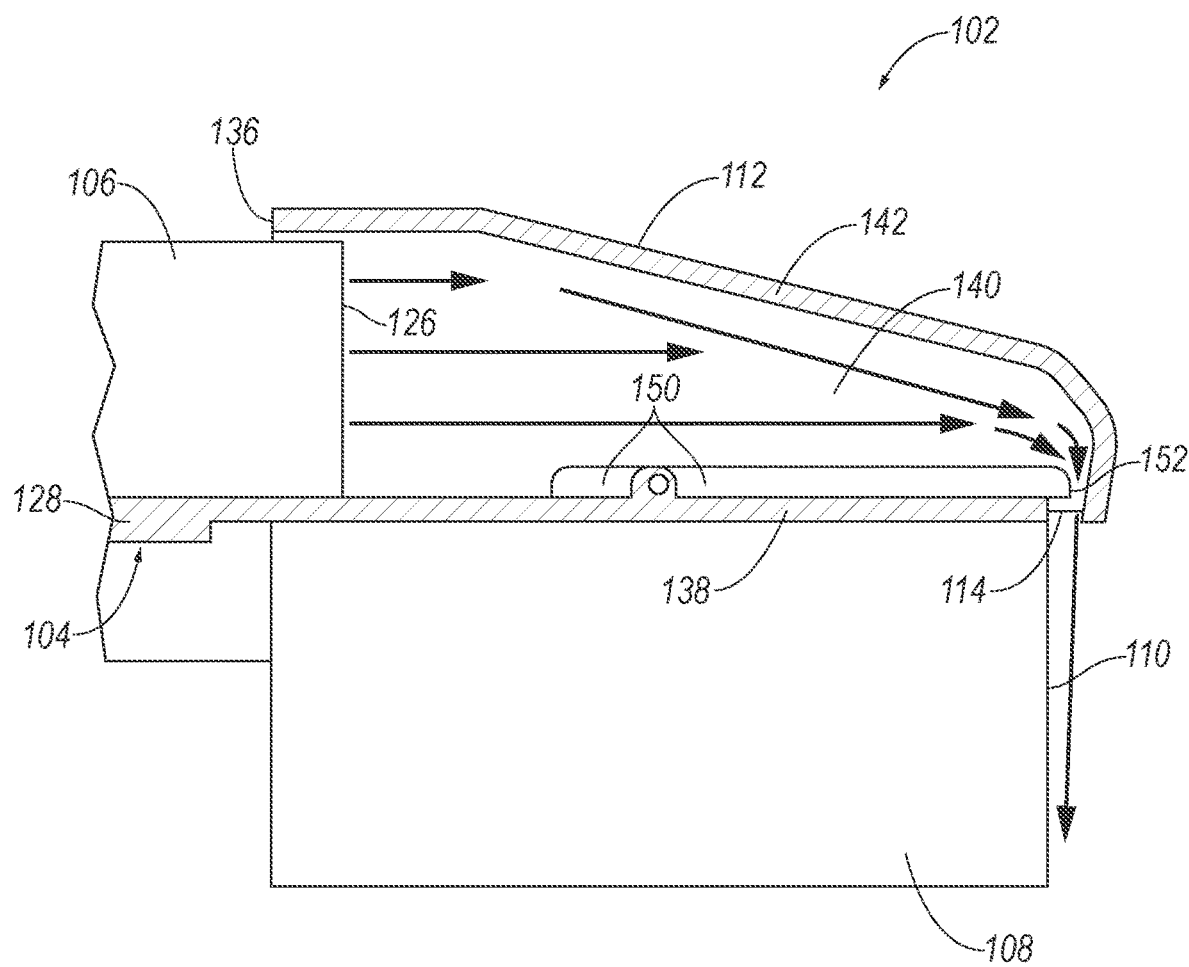
FIG. 5 is a side cross-sectional view of a portion of the sensor assembly.
Figure 6:
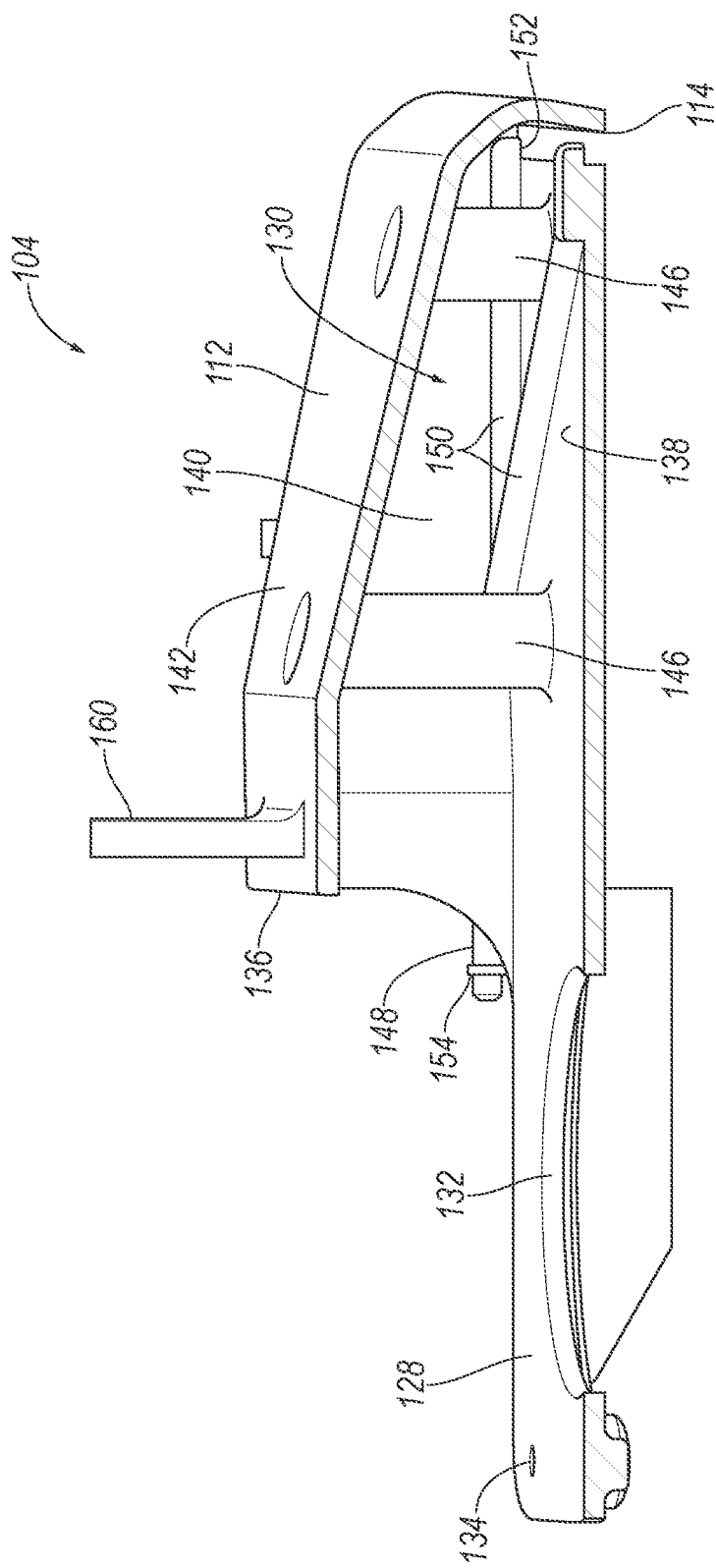
FIG. 6 is a side cross-sectional view of a bracket of the second example of the sensor assembly.
Figure 7:
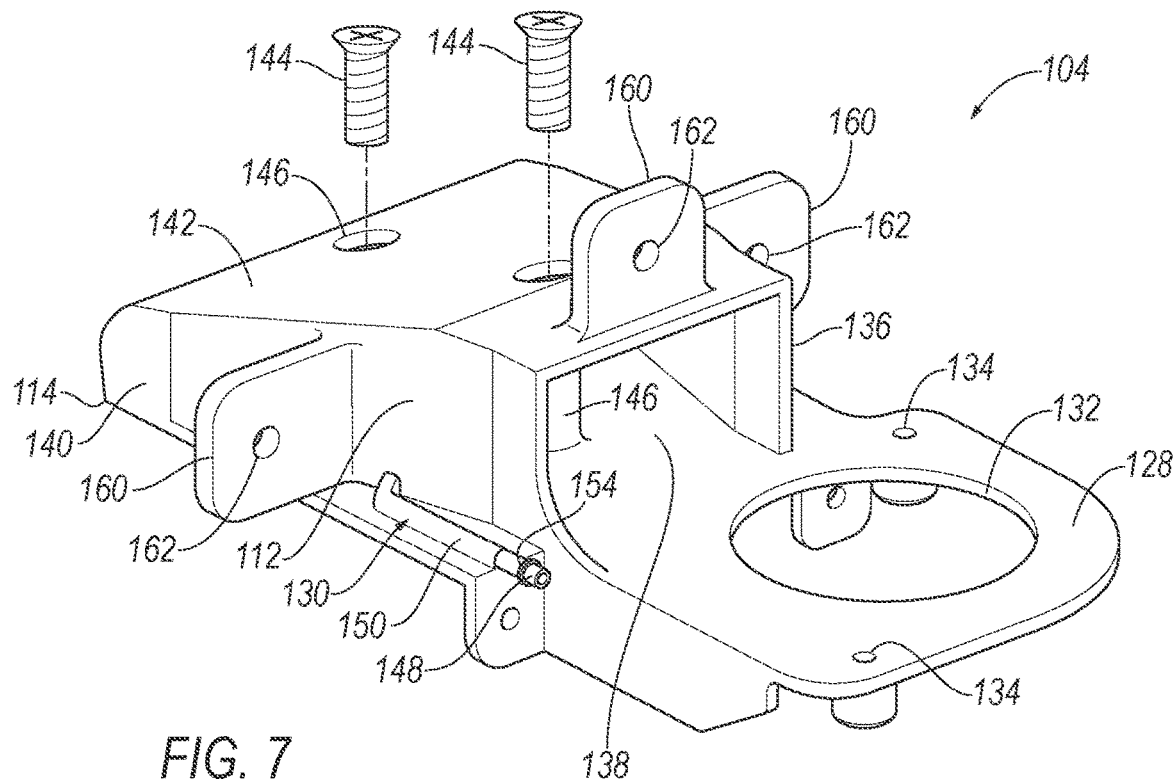
FIG. 7 is a rear perspective view of the bracket.

With reference to FIGS. 5-7, the bracket 104 includes the first duct 112. The first duct 112 is positioned to receive airflow directly from the blower 106 and direct the airflow onto the sensor window 110. The first duct 112 includes a first duct inlet 136 and the first duct outlet 114. The first duct inlet 136 is arranged to receive the airflow directly from the blower 106. For example, the blower outlet 126 may be positioned inside the first duct inlet 136, as shown in FIG. 5, or the blower outlet 126 may abut the first duct inlet 136. Airflow exiting the blower outlet 126 thereby enters the first duct 112 via the first duct inlet 136. The first duct 112 defines an airflow path from the first duct inlet 136 to the first duct outlet 114. The airflow travels through the first duct 112 from the first duct inlet 136 to the first duct outlet 114. The first duct outlet 114 may be positioned and shaped to direct the airflow traveling through the first duct 112 onto the sensor window 110.

The first duct 112 may include a bottom panel 138, two side panels 140, and a top panel 142. The bottom panel 138, the side panels 140, and the top panel 142 may extend from the first duct inlet 136 to the first duct outlet 114. The bottom panel 138, the side panels 140, and the top panel 142 may collectively extend fully around the airflow path through the first duct 112. A cross-sectional area of the first duct 112 orthogonal to the direction of the airflow path may decrease along the airflow path, e.g., along a direction pointing from the first duct inlet 136 to the first duct outlet 114. The cross-sectional area may be defined by the bottom panel 138, the side panels 140, and the top panel 142. The bottom panel 138 and the side panels 140 may be flat. The bottom panel 138 may extend horizontally. The horizontality of the bottom panel 138 may provide a mounting surface for the sensor 108, as described below. The side panels 140 may extend vertically and parallel to each other. The bottom panel 138 and the top panel 142 may slope toward each other along the direction pointing from the first duct inlet 136 to the first duct outlet 114, thereby decreasing the cross-sectional area. The top panel 142 may be sloped downward along the direction pointing from the first duct inlet 136 to the first duct outlet 114. The decreasing cross-sectional area may supply a high speed to the airflow exiting the first duct outlet 114.

With continued reference to FIGS. 5-7, the sensor 108 is positioned below the first duct 112. The sensor 108 may abut the first duct 112, e.g., the bottom panel 138 of the first duct 112. The sensor 108 may extend below the first duct 112 from at or near the first duct inlet 136 to at or near the first duct outlet 114.

The sensor 108 is mounted to the bracket 104 and supported by the bracket 104. The sensor 108 may be suspended from the bracket 104, e.g., from the first duct 112. In other words, a top of the sensor 108 may be supported by the bracket 104 from above, and a bottom of the sensor 108 may be unsupported by the bracket 104. An entire weight of the sensor 108 may be supported by the bracket 104, e.g., by the first duct 112.

For example, the sensor 108 may be fastened to the first duct 112. At least one fastener 144, e.g., at least two fasteners 144 as shown in the Figures, may fasten the sensor 108 to the first duct 112. The bracket 104 may include at least one fastener receptacle 146, e.g., one fastener receptacle 146 per fastener 144 fastening the sensor 108 to the first duct 112. The fastener receptacles 146 may extend through the first duct 112, e.g., vertically from the top panel 142 to the bottom panel 138. Each fastener receptacle 146 may extend through a middle of the airflow path, i.e., the airflow path may be split by the fastener receptacle 146 and rejoin past the fastener receptacle 146. The fastener receptacles 146 may have a cylindrical shape with an inner diameter slightly larger than a diameter of a head of the fastener 144, and the top panel 142 may be open above the insides of the fastener receptacles 146, permitting the fasteners 144 to be inserted into the fastener receptacles 146. The fastener 144 may extend through the fastener receptacle 146, e.g., from inside the fastener receptacle 146 near a bottom of the fastener receptacle 146 downward into the sensor 108.

Figure 8:
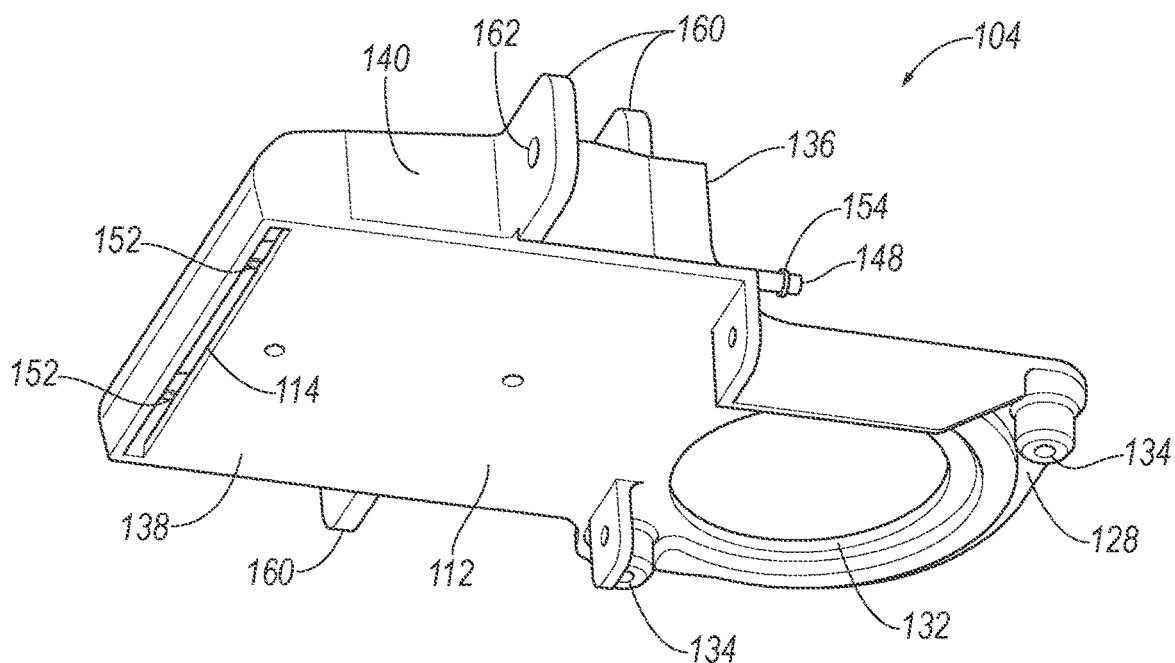
FIG. 8 is a bottom perspective view of the bracket.

With reference to FIG. 8, the first duct outlet 114 is positioned to direct the airflow traveling through the first duct 112 onto the sensor window 110. The first duct outlet 114 may be slot-shaped. The first duct outlet 114 may be elongated horizontally parallel to the sensor window 110 from one edge of the sensor window 110 to the other edge of the sensor window 110, thereby providing airflow to an entirety of the sensor window 110. The first duct outlet 114 may have a constant width, measured perpendicular to the sensor window 110 from one end of the first duct outlet 114 to the other end of the first duct outlet 114, for providing even pressure along the sensor window 110. The cross-sectional area of the first duct outlet 114, e.g., a length from one end to the other end of the first duct outlet 114 multiplied by the constant width, may be smaller than the cross-sectional area of the first duct inlet 136. The smaller cross-sectional area may supply a high speed to the airflow exiting the first duct outlet 114.

With reference to FIGS. 6-8, the bracket 104 may include the fluid network 130. The fluid network 130 includes a fluid inlet 148 (best seen in FIG. 7), at least one fluid line 150 (as shown in FIG. 6), and at least one fluid nozzle 152 (shown in FIGS. 8-10). The fluid inlet 148, fluid lines 150, and fluid nozzles 152 are fluidly connected to each other (i.e., fluid can flow from one to the other) in series. The fluid network 130 distributes washer fluid received via the fluid inlet 148 to the fluid nozzles 152. "Washer fluid" is any liquid stored in the vehicle 100 for cleaning. The washer fluid may include solvents, detergents, diluents such as water, etc.

With reference to FIG. 7, the bracket 104 includes the fluid inlet 148. The fluid inlet 148 may be positioned outside of the first duct 112. The fluid inlet 148 may be shaped to connect to a hose, with such a connection facilitated by the position of the fluid inlet 148 outside the first duct 112. For example, the fluid inlet 148 may be shaped to receive and grip the hose internally.

Alternatively, the fluid inlet 148 may be shaped for the hose to extend around and fasten to externally. To that end, the fluid inlet 148 may include a flange 154 extending radially outward and angled away from a fluid-flow direction into the fluid inlet 148. The flange 154 makes connections to the fluid inlet 148 easy to attach and also serves to hold a connected hose (not shown) on the fluid inlet 148.

Returning to FIGS. 5 and 6, the bracket 104 includes the fluid lines 150. The fluid lines 150 are elongated between the fluid inlet 148 and the fluid nozzles 152. In the case of multiple nozzles, the fluid lines 150 may branch from a single fluid line 150 extending from the fluid inlet 148 into multiple fluid lines 150 in parallel leading to the respective fluid nozzles 152. The fluid lines 150 may extend through an interior of the first duct 112, thereby not causing a protrusion on the first duct 112. The fluid lines 150 may be at least partially formed of a panel of the first duct 112, e.g., the bottom panel 138, thereby reducing dimensional stackup.

Figure 9:
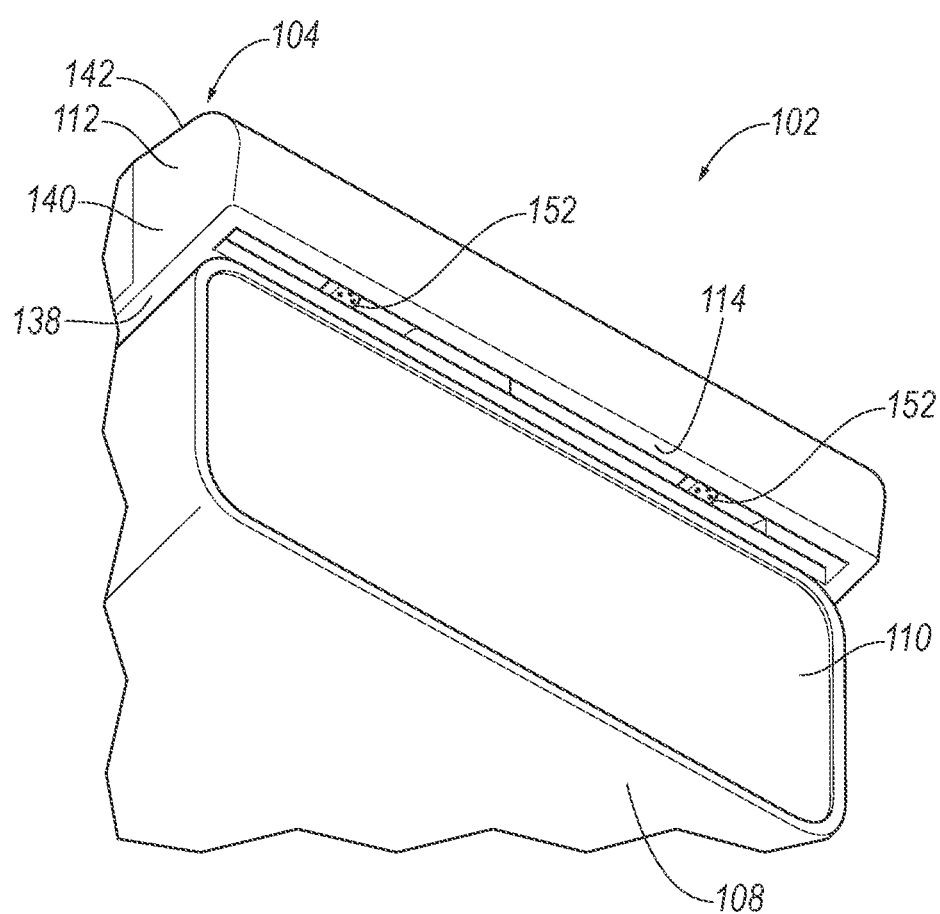
FIG. 9 is a bottom perspective view of a portion of the sensor assembly.
Figure 10:
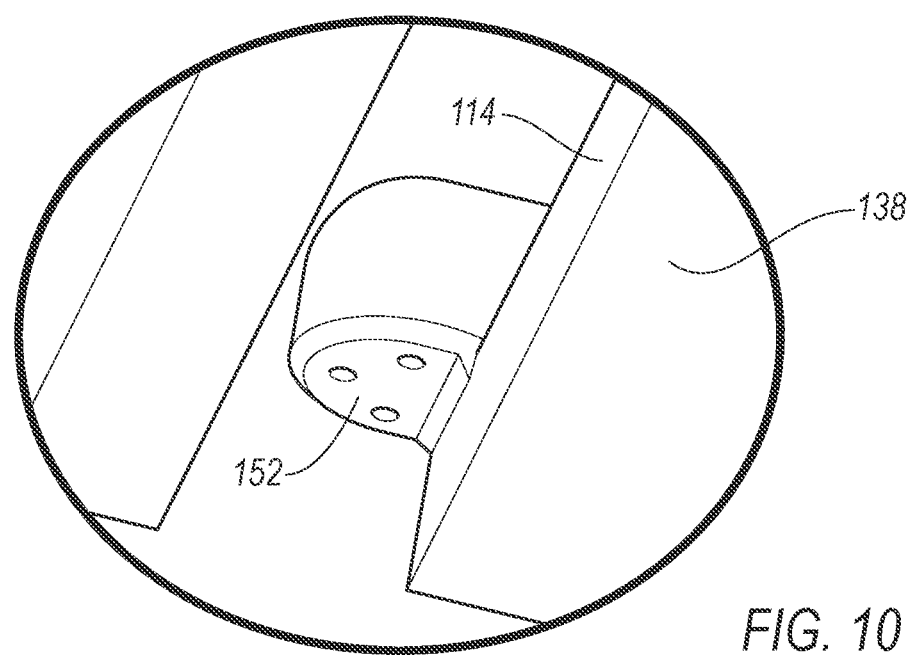
FIG. 10 is a bottom perspective view of a portion of the bracket.

With reference to FIGS. 9 and 10, the bracket 104 includes the fluid nozzles 152. The fluid nozzles 152 are shaped to dispense fluid onto the sensor window 110. The fluid nozzles 152 may be positioned in the first duct outlet 114. The fluid nozzles 152 may be oriented to dispense the fluid in the same direction as airflow through the first duct outlet 114. The fluid nozzles 152 may thus be able to dispense fluid onto the sensor window 110 even when the blower 106 is blowing air through the first duct 112 and across the sensor window 110.

Returning to FIGS. 2-4, the second duct 122 extends from a second duct inlet 156 to a second duct outlet 158. The second duct inlet 156 may be positioned to draw airflow from outside the sensor assembly 102, e.g., from an ambient environment outside the vehicle 100. The second duct outlet 158 is positioned to exhaust airflow into the blower inlet 124. The second duct 122 may have a smoothly curving shape from the second duct inlet 156 to the second duct outlet 158, i.e., a shape without sharp corners. The second duct 122 may have a constant cross-sectional area from the second duct inlet 156 to the second duct outlet 158. The shape and/or cross-sectional area can help promote laminar airflow reaching the blower 106, which allows a greater quantity of air to reach the blower 106 for greater output by the blower 106. The second duct 122 may extend directly below the first duct 112, i.e., a vertical line extends through the first duct 112 and the second duct 122. The second duct 122 may extend directly below the sensor 108, i.e., a vertical line extends through the sensor 108 and the second duct 122. The sensor 108 may be positioned directly between the first duct 112 and the second duct 122, i.e., a straight line passes through the first duct 112, the sensor 108, and the second duct 122 in that order. This arrangement permits the smoothly curving shape of the second duct 122 while still fitting the sensor assembly 102 in a small package.

The Figures show two examples of the second duct 122. All the foregoing description, except where explicitly noted, applies to both of the examples.

Returning to FIG. 3, for the first example of the second duct 122, the bracket 104 includes the second duct 122, thereby reducing a stackup between the second duct 122 and the rest of the bracket 104. The second duct 122 is elongated from the port 132 of the blower panel 128 to a free end. The second duct outlet 158 is the port 132. The second duct inlet 156 is the free end. The second duct inlet 156 is a free end in that the second duct inlet 156 is only part of the bracket 104 via the second duct 122, i.e., the second duct inlet 156 is hanging away from the rest of the bracket 104. The second duct inlet 156 is spaced from the first duct 112, e.g., the sensor 108 is directly between the second duct inlet 156 and the first duct 112.

Returning to FIG. 4, for the second example of the second duct 122, the second duct 122 is a separate component from the bracket 104. The second duct outlet 158 is positioned adjacent and concentric to the port 132, e.g., is abutting the port 132 and is aligned with the port 132. The second duct outlet 158 is positioned to exhaust airflow through the port 132 into the blower inlet 124. The second duct 122 may be mounted to the blower panel 128 and suspended from the blower panel 128.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a bracket;
   a blower mounted to the bracket and supported by the bracket; and
   a sensor mounted to the bracket and supported by the bracket, the sensor including a sensor window;
   the bracket being a single piece;
   the bracket including a duct positioned to receive airflow directly from the blower;
   the duct including a duct outlet positioned to direct the airflow traveling through the duct onto the sensor window;
   the bracket including a fluid nozzle shaped to dispense fluid onto the sensor window;
   the bracket including a fluid line elongated from the fluid nozzle; and
   the fluid line extending through an interior of the duct.

2. The sensor assembly of claim 1, wherein the blower includes a blower outlet, the duct includes a duct inlet, and the blower outlet is positioned inside the duct inlet.

3. The sensor assembly of claim 2, wherein a cross-sectional area of the duct outlet is smaller than a cross-sectional area of the duct inlet.

4. The sensor assembly of claim 1, wherein the bracket includes a blower panel to which the blower is mounted.

5. The sensor assembly of claim 4, wherein the blower includes a blower inlet, and the blower panel includes a port aligned with the blower inlet and abutting the blower inlet.

6. The sensor assembly of claim 5, wherein the duct is a first duct, the bracket includes a second duct elongated from the port.

7. The sensor assembly of claim 6, wherein the second duct is elongated from the port to a free end, and the free end is spaced from the first duct.

8. The sensor assembly of claim 7, wherein the second duct extends directly below the first duct.

9. The sensor assembly of claim 8, wherein the sensor is positioned directly between the first duct and the second duct.

10. The sensor assembly of claim 1, wherein the sensor is suspended from the bracket.

11. The sensor assembly of claim 10, wherein the sensor is suspended from the duct.

12. The sensor assembly of claim 11, wherein the sensor abuts the duct.

13. The sensor assembly of claim 11, wherein the sensor is fastened to the duct.

14. The sensor assembly of claim 13, further comprising a fastener fastening the sensor to the duct, wherein the bracket includes a fastener receptacle extending through the duct, and the fastener extends through the fastener receptacle.

15. The sensor assembly of claim 1, wherein the fluid line is partially formed of a panel of the duct.

16. The sensor assembly of claim 1, wherein the bracket includes a fluid inlet fluidly connected to the fluid nozzle, and the fluid inlet is shaped to connect to a hose.

17. The sensor assembly of claim 1, wherein the fluid nozzle is positioned in the duct outlet.

18. A sensor assembly comprising:
    a bracket;
    a blower mounted to the bracket and supported by the bracket; and
    a sensor mounted to the bracket and supported by the bracket, the sensor including a sensor window;
    the bracket being a single piece;
    the bracket including a duct positioned to receive airflow directly from the blower;
    the duct including a duct outlet positioned to direct the airflow traveling through the duct onto the sensor window;
    the bracket including a fluid nozzle shaped to dispense fluid onto the sensor window;
    the bracket including a fluid line elongated from the fluid nozzle; and
    the fluid line being partially formed of a panel of the duct.

19. A sensor assembly comprising:
    a bracket;
    a blower mounted to the bracket and supported by the bracket; and
    a sensor mounted to the bracket and supported by the bracket, the sensor including a sensor window;
    the bracket being a single piece;
    the bracket including a duct positioned to receive airflow directly from the blower;
    the duct including a duct outlet positioned to direct the airflow traveling through the duct onto the sensor window;
    the bracket including a fluid nozzle shaped to dispense fluid onto the sensor window;
    the bracket including a fluid inlet fluidly connected to the fluid nozzle; and
    the fluid inlet being shaped to connect to a hose.

20. A sensor assembly comprising:
    a bracket;
    a blower mounted to the bracket and supported by the bracket; and
    a sensor mounted to the bracket and supported by the bracket, the sensor including a sensor window;
    the bracket being a single piece;
    the bracket including a duct positioned to receive airflow directly from the blower;
    the duct including a duct outlet positioned to direct the airflow traveling through the duct onto the sensor window;
    the bracket including a fluid nozzle shaped to dispense fluid onto the sensor window; and
    the fluid nozzle being positioned in the duct outlet.

* * * * *